(12) United States Patent  
Nakai

(10) Patent No.: US 9,377,946 B2
(45) Date of Patent: Jun. 28, 2016

(54) ON-BOARD APPARATUS

(71) Applicant: Panasonic Corporation, Osaka (JP)

(72) Inventor: Jun Nakai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 14/369,830

(22) PCT Filed: Mar. 7, 2013

(86) PCT No.: PCT/JP2013/001476
§ 371 (c)(1),
(2) Date: Jun. 30, 2014

(87) PCT Pub. No.: WO2013/140731
PCT Pub. Date: Sep. 26, 2013

(65) Prior Publication Data
US 2015/0009163 A1    Jan. 8, 2015

(30) Foreign Application Priority Data

Mar. 19, 2012    (JP) .................................. 2012-061461

(51) Int. Cl.
*G06F 3/0488* (2013.01)
*B60R 16/02* (2006.01)
*G01C 21/36* (2006.01)
*G06F 3/041* (2006.01)

(52) U.S. Cl.
CPC .............. *G06F 3/0488* (2013.01); *B60R 16/02* (2013.01); *G01C 21/3664* (2013.01); *G06F 3/041* (2013.01); *G06F 3/04883* (2013.01)

(58) Field of Classification Search
None
See application file for complete search history.

(56) References Cited

U.S. PATENT DOCUMENTS

| 8,150,619 B2 | 4/2012 | Sakano |
| 8,910,086 B2 | 12/2014 | Bendewald et al. |
| 2005/0267676 A1 | 12/2005 | Nezu et al. |

(Continued)

FOREIGN PATENT DOCUMENTS

| CN | 1704886 A | 12/2005 |
| CN | 101050968 A | 10/2007 |

(Continued)

OTHER PUBLICATIONS

English Translation of Search Report for Chinese Application No. 201380004778.3 dated Aug. 24, 2015.

(Continued)

*Primary Examiner* — Kent Chang
*Assistant Examiner* — Nathan Brittingham
(74) *Attorney, Agent, or Firm* — Pearne & Gordon LLP

(57) ABSTRACT

Provided is an on-board apparatus such that a function that is not displayed on an image display unit can be safely operated in a simple operation even during travel without watching the image display unit. An on-board apparatus (10) is provided with: a touch panel (18) for detecting information about a position touched by an operator; a display mode recognition unit (32) that recognizes a mode displayed on an image display unit (17); a gesture recognition unit (33) that recognizes a gesture inputted via the touch panel; and an operation mode determination unit (34) that determines an operation mode depending on the travel status of the vehicle and on the basis of the gesture. Thus, the function that is not displayed on the image display unit (17) can be simply operated by the gesture for implementing the function that is limited during travel.

5 Claims, 5 Drawing Sheets

(56) References Cited

U.S. PATENT DOCUMENTS

| | | |
|---|---|---|
| 2008/0027637 A1 | 1/2008 | Sakano |
| 2010/0122167 A1* | 5/2010 | Ryu .................. G06F 3/04883 715/716 |
| 2012/0098768 A1 | 4/2012 | Bendewald et al. |
| 2012/0262403 A1* | 10/2012 | Tissot .................. B60K 35/00 345/173 |

FOREIGN PATENT DOCUMENTS

| | | |
|---|---|---|
| CN | 101614549 A | 12/2009 |
| JP | 2005-339420 A | 12/2005 |
| JP | 2006-017478 A | 1/2006 |
| JP | 2009-090690 A | 4/2009 |
| WO | 2010/142543 A1 | 12/2010 |
| WO | 2011/083212 A1 | 7/2011 |

OTHER PUBLICATIONS

Extended European Search for Application No. 13764271.6-1557/2829440 PCT/JP2013001476 dated Feb. 19, 2015.

International Search Report for Application No. PCT/JP2013/001476 dated Jun. 11, 2013.

* cited by examiner

ON-BOARD APPARATUS

TECHNICAL FIELD

The present invention relates to an in-vehicle apparatus including an image display section and a touch panel.

BACKGROUND ART

In recent years, it has become general to provide in-vehicle apparatuses having a car navigation system for guiding a route, a DVD playback feature, a CD playback feature in vehicles.

In such an in-vehicle apparatus, an image display section such as a liquid crystal display is provided near the driving seat in the vehicle interior to display, for example, a map around the current running position of the vehicle or various kinds of input setting screens on the image display section. Moreover, a larger image display section provides better visibility. For this reason, there is known a configuration in which mechanical buttons disposed around the image display section are reduced to provide a larger image display section while a touch panel is provided on the surface of the image display section. An operator performs an input operation to the in-vehicle apparatus by performing a touch operation, such as touching, flicking, or dragging on a part of the touch panel.

When an operator looks at an image display section for an operation or performs a detailed touch operation on a touch panel (e.g., operator looks at the section for more than two seconds), the operator no longer pays attention to the forward direction of the vehicle and his or her concentration on driving may decrease. Accordingly, it is not preferred to operate a touch panel while driving, for safety reasons.

Therefore, while the operator is driving, i.e., while the vehicle is running, operations for the in-vehicle apparatus are often restricted at a certain level in consideration of ensuring both safe driving and appropriate operationality of the in-vehicle apparatus.

As a conventional navigation apparatus, there is known an apparatus in which, upon detection of running of the vehicle, a touch area of a button displayed on a touch panel of the navigation apparatus is made larger in size than a touch area to be displayed while the vehicle is not running, in order to enhance the operability during driving (for example,. see PTL 1).

Moreover, there is also known a touch panel apparatus in which a display form of a display portion is changed in response to the running state and movement of the vehicle in order to ease the operation during driving (for example, see PTL 2).

CITATION LIST

Patent Literature

PTL 1
Japanese Patent Application Laid-Open No. 2006-17478
PTL 2
Japanese Patent Application Laid-Open No. 2009-90690

SUMMARY OF INVENTION

Technical Problem

However, in an in-vehicle apparatus including a conventional touch panel, an operator visually checks, for example, a button displayed on an image display section and performs an input operation by touching a desired position on the touch panel, such as a position where the button is displayed. Therefore, the in-vehicle apparatus including the conventional touch panel does not address the root cause of the problem, which is a situation where the need for the operator to look at the image display section causes the operator to pay no attention to the forward direction of the vehicle and the concentration of the operator on driving may be lowered.

Moreover, the in-vehicle apparatus including the conventional touch panel allows for an operation of only a function assigned to a button or the like displayed on the image display section. Therefore, in order to operate a function not displayed on the image display section, the operator first needs to switch a function displayed on the image display section. For this reason, the in-vehicle apparatus including the conventional touch panel involves complicated operations and need longer time. Thus, the in-vehicle apparatus including the conventional touch panel cannot avoid the problem, which is a situation where the operator pays no attention to the forward direction of the vehicle and the concentration of the operator on driving may decrease.

It is an object of the present invention to provide an in-vehicle apparatus that allows the operator to safely operate a function not displayed on the image display section with an easy operation without causing the operator to pay no attention to the forward direction of the vehicle due to the situation where the operator looks at the image display section while the vehicle is running.

Solution to Problem

In order to achieve the object described above, the present invention provides an in-vehicle apparatus including: an image display section that displays an image; a touch panel that is provided over the image display section and that detects information on a position touched by an operator; and a control section that recognizes an operation mode displayed on the image display section and a gesture inputted on the touch panel, and that determines, in accordance with a running state of the vehicle, to what operation mode the recognized gesture is performed as an operation, in which, when determining that the recognized gesture is performed as the operation to an operation mode other than the operation mode displayed on the image display section, the control section performs a function assigned to the gesture in the operation mode other than the operation mode displayed on the image display section.

Advantageous Effects of Invention

The present invention can determine that a gesture inputted from the touch panel is an operation made to an operation mode other than a displayed operation mode, in accordance with the running state of the vehicle. Therefore, the present invention provides advantageous effects that it is possible to easily perform an operation to an operation mode other than a displayed operation mode even during running of the vehicle and thus to reduce situations where the operator pays no attention to the forward direction of the vehicle.

DESCRIPTION OF EMBODIMENTS

Hereinafter, an in-vehicle apparatus according to an embodiment of the present invention will be described with reference to the accompanying drawings.

In the following description, however, the in-vehicle apparatus includes a touch panel and is exemplified and explained as an in-vehicle navigation apparatus. Therefore, this navigation apparatus including the touch panel is simply referred to as "an in-vehicle apparatus."

Figure 1:
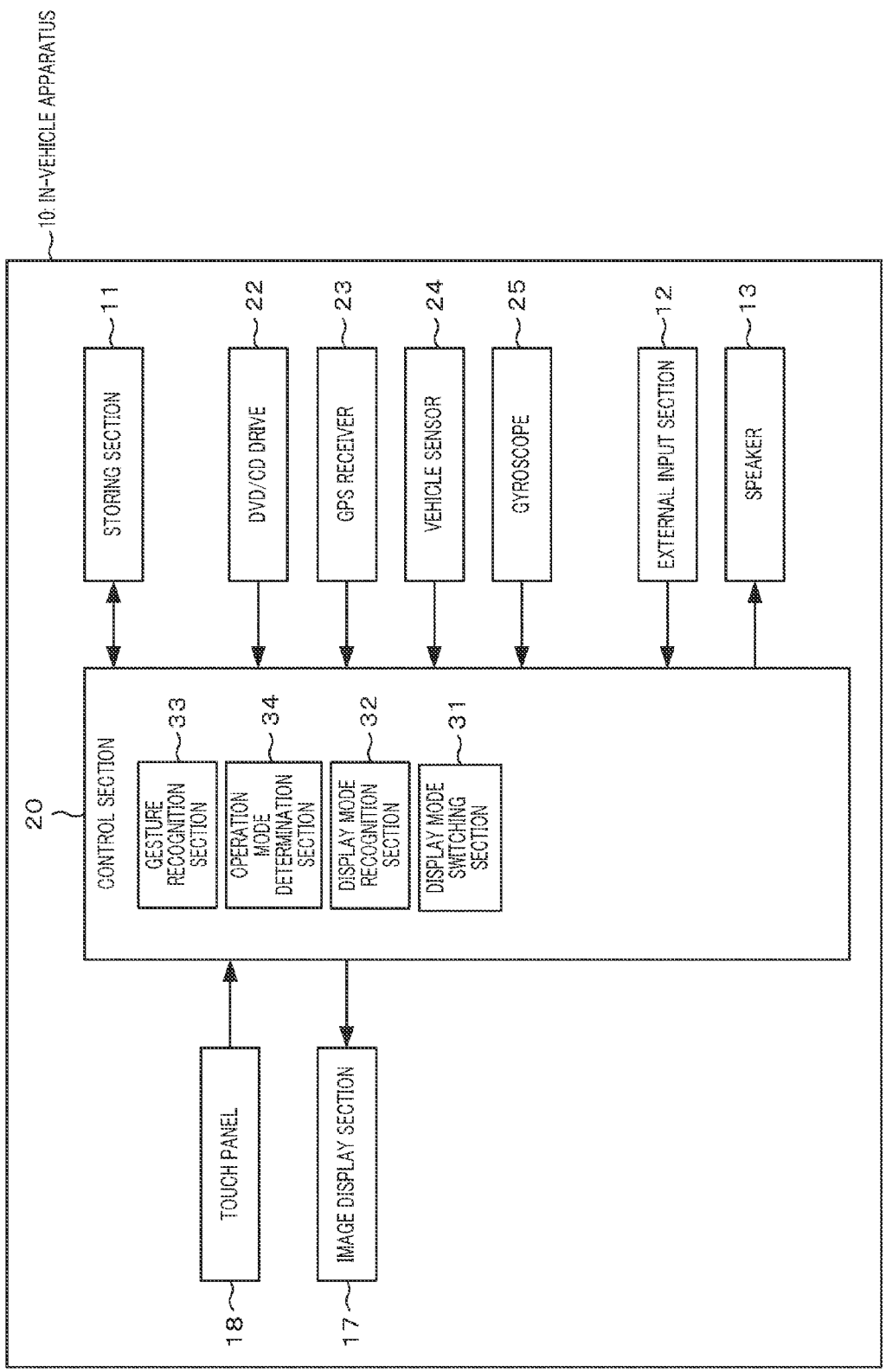
FIG. 1 is a block diagram of an in-vehicle apparatus in an embodiment of the present invention.

FIG. 1 is a block diagram of the in-vehicle apparatus in the embodiment of the present invention.

In-vehicle apparatus 10 in the present embodiment includes, for example, a navigation function for guiding a route, an audio visual reproduction function reproducing an audio image recorded on recording media, such as DVD (Digital Versatile Disc).

In FIG. 1, in-vehicle apparatus 10 includes storing section 11, external input section 12, speaker 13, image display section 17, touch panel 18, control section 20, DVD/CD drive 22, GPS receiver 23, vehicle sensor 24, gyroscope 25, display mode switching section 31, display mode recognition section 32, gesture recognition section 33, and operation mode determination section 34.

However, DVD/CD drive 22, GPS receiver 23, vehicle sensor 24, gyroscope 25, and speaker 13 need not be provided integrally within in-vehicle apparatus 10. These components may be each configured to be electrically detachable from in-vehicle apparatus 10. Image display section 17 and touch panel 18 may be integrated in structure.

Storing section 11 is a data storing apparatus, such as an HDD, an SD card, and a flash memory implemented on a printed circuit board inside the in-vehicle apparatus, and a single kind or a plurality of kinds of storing apparatuses may be employed together.

Storing section 11 stores programs and databases. For example, the programs include a basic program necessary for controlling the icon size (the size of an icon, or the display region of the icon) and the icon layout displayed on image display section 17, and operations of in-vehicle apparatus 10. For another example, the programs include a program for controlling displaying of images, and application software used for executing a navigation function or executing an audio visual reproduction function. For example, the databases include a database on a map for navigation or a database for telephone numbers.

Moreover, storing section 11 includes, for example, a region for expanding various programs or various pieces of data and a region for expanding an image, similarly to a general storing section.

External input section 12 is provided in order to input a signal outputted from an external apparatus connectable to in-vehicle apparatus 10, and can receive, for example, an image signal or an audio signal provided by reproducing media, such as a DVD and a CD, or an image signal or an audio signal from a digital television.

Speaker 13 is provided in order to output, for example, a sound effect for reporting to an operator that in-vehicle apparatus 10 has received an operation to in-vehicle apparatus 10, sound inputted to external input section 12 from an external apparatus, or sound and music reproduced by DVD/CD drive 22 embedded inside in-vehicle apparatus 10.

Image display section 17 is provided in order to display, for example, a menu screen or an opening screen stored in storing section 11, or data of a still or moving image inputted from an external apparatus to external input section 12. A typical liquid crystal display is provided as image display section 17 in the present embodiment.

That is, image display section 17 includes a liquid crystal panel, a back light unit, electric components, and a power supply unit. The liquid crystal panel includes, for example, a polarizing filter, a liquid crystal, a glass substrate, and a color filter. The back light unit is used for a light source for a liquid crystal panel, such as a cold cathode tube, an LED, and a light guide plate. The electric components are, for example, ICs controlling various signals for displaying images. The power supply unit is a power source for driving the liquid crystal, back light unit, and electronic components. However, the power supply unit may not be included in image display section 17 and may be provided as a separate unit.

Touch panel 18 is provided in the interior of or on the surface of image display section 17, and is a transparent panel having a conductive layer. An input operation through touch panel 18 to in-vehicle apparatus 10 is performed by outputting, to control section 20, information on a change in the amount of electrostatic capacitance generated by a touch operation (touching or approaching at a predetermined speed) on an applicable part displayed on image display section 17 and information on the operated position. For example, when an icon is displayed, the "applicable part" is the position of the icon displayed on the image display section. For another example, when a map is displayed, the "applicable part" is an arbitrary point displayed on the image display section.

Control section 20 includes a microprocessor and an electrical circuit for operating the microprocessor, executes a control program stored by storing section 11, and performs various kinds of control processes. Control section 20 also performs a control process so as to display image data obtained as a result of these control processes on the image display section 17.

Control section 20 includes display mode switching section 31, display mode recognition section 32, gesture recognition section 33, and operation mode determination section 34.

The term "operation mode" refers to a function such as a navigation function, a CD playback function, or an image signal display function with respect to an external apparatus, which is executed by in-vehicle apparatus 10.

Display mode switching section 31 is provided in order to switch a function displayed on image display section 17. For example, the display mode is a navigation mode when a map for route guidance of the navigation function is displayed on image display section 17. Meanwhile, the display mode is a CD playback mode in the case of displaying, for example, the album name and song title of a CD being played back, and operation icons for CD playback, such as a volume control, playback, and stop. Display mode switching section 31 switches between the displaying of a map in the navigation mode, and the displaying of the album name and the song title of a CD, and operation icons for CD playback, such as a volume control, playback, and stop in the CD playback mode.

Display mode recognition section 32 is provided in order to recognize a function displayed on image display section 17.

Gesture recognition section 33 is provided in order to recognize a gesture such as a flicking on the basis of a time transition in a signal for a touch position outputted from touch panel 18 to control section 20.

Operation mode determination section 34 is provided in order to determine an operation mode to be performed, by the gesture recognized in gesture recognition section 33.

Moreover, control section 20 may include one microprocessor or may include a plurality of microprocessors for respective functions such as DVD playback and audio playback.

DVD/CD drive 22 is provided in order to play back a disk storing an audio source (or audio data) and an image source (or image data).

GPS receiver 23 is provided in order to receive a signal from a GPS satellite.

Vehicle sensor 24 is provided in order to receive a vehicle speed signal and a parking brake signal from a vehicle and to determine a vehicle state such as the moving speed of the vehicle and the state of the parking brake.

Gyroscope 25 is provided in order to detect the amount of rotation, a variation in vertical movement and the acceleration of a vehicle.

Detailed operations of in-vehicle apparatus 10 configured in the manner described above will be explained below with reference to FIGS. 2 to 5.

Figure 2:
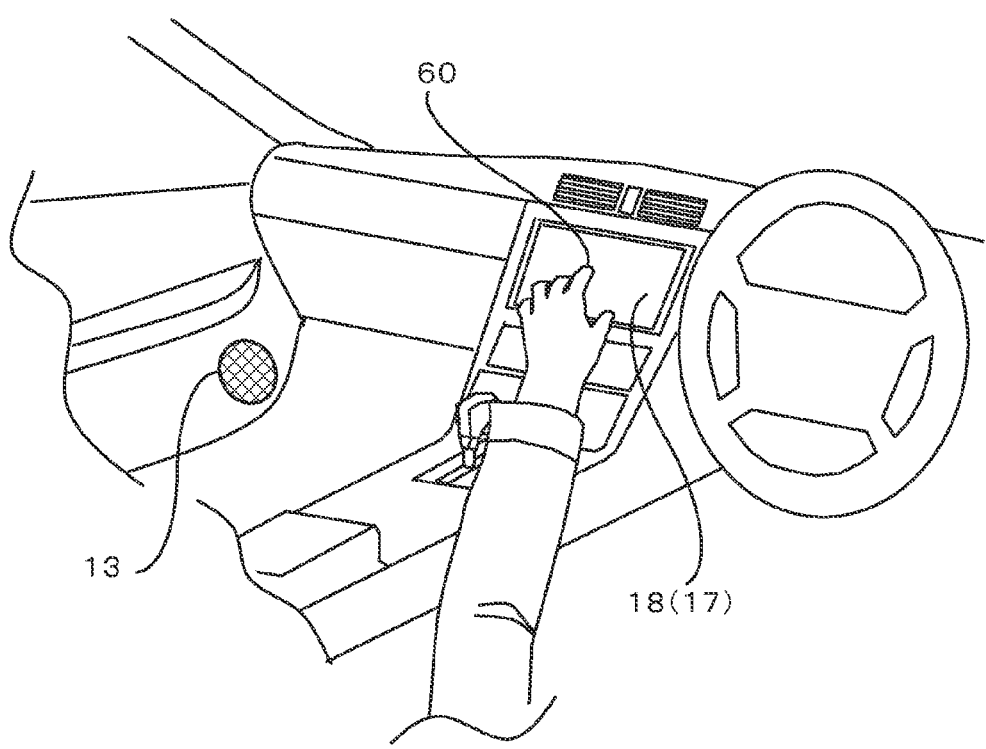
FIG. 2 is a perspective view illustrating an example placement of the in-vehicle apparatus in a vehicle in the embodiment of the present invention.

FIG. 2 is a simple perspective view illustrating an example placement inside a vehicle for explaining how to use in-vehicle apparatus 10 in the embodiment of the present invention.

In-vehicle apparatus 10 in the embodiment of the present invention is attached to the center console of a vehicle, and an operator touches touch panel 18 provided on image display section 17 with finger 60 to perform an input operation.

Speaker 13 is attached inside the vehicle.

Next, the operations of in-vehicle apparatus 10 in the present embodiment will be explained.

In in-vehicle apparatus 10 in the present embodiment, operation mode determination section 34 determines an operation mode to be performed by gesture inputted by an operator. In order to assist in understanding this explanation, with reference to FIGS. 3A to 3D, negative effects will be first described, which may occur when operation mode determination section 34 does not determine an operation mode to be performed by gesture inputted by the operator, i.e., when gesture inputted from the operator is performed for an operation mode always displayed.

Figure 3A:
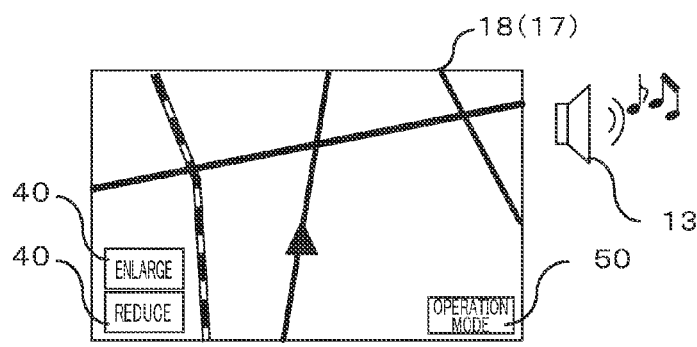
FIG. 3A illustrates an example display image of an image display section in a display mode that is a navigation mode when a plurality of modes are performed.

As illustrated in FIG. 3A, image display section 17 displays a map for the navigation function, icons 40 for enlarging or reducing the map, and display mode change icon 50 for changing a function displayed on image display section 17.

Meanwhile, speaker 13 outputting music is schematically illustrated in order to illustrate that in-vehicle apparatus 10 also performs the CD playback function at the same time. That is, in-vehicle apparatus 10 performs the two modes that are the navigation mode and the CD playback mode.

Since the map and icon 40 for the navigation mode are displayed on image display section 17 at this time, display mode recognition section 32 recognizes that the display mode is the navigation mode.

Figure 3B:
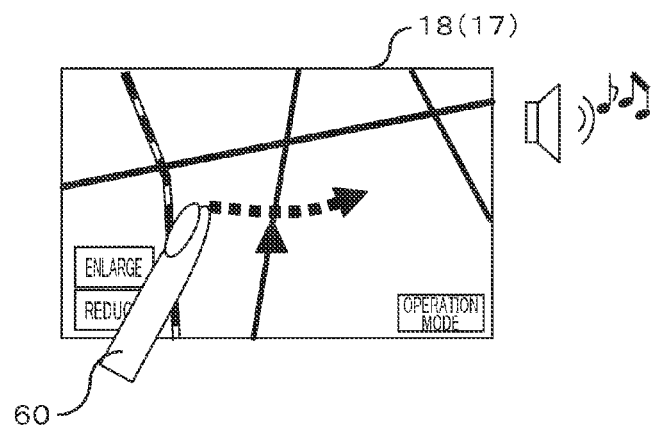
FIG. 3B illustrates an image of a state in which an operator performs flicking input on a touch panel when the display mode is the navigation mode.

FIG. 3B illustrates that the operator performs gesture input for rightward flicking on touch panel 18 with finger 60 when the CD playback mode is performed and when the display mode is the navigation mode.

Figure 3C:
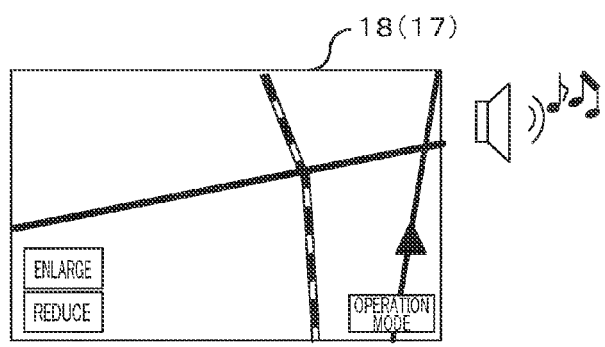
FIG. 3C illustrates an image of an example operation of the in-vehicle apparatus when the operator performs flicking input on the touch panel during stopping of the vehicle.

FIG. 3C illustrates an example operation in a case where gesture input for rightward flicking is performed on touch panel 18 of in-vehicle apparatus 10 executing the CD playback mode while the display mode is the navigation mode, when control section 20 determines that the vehicle is stopping on the basis of a signal from vehicle sensor 24.

Since the gesture for rightward flicking is an operation for the navigation mode as the display mode, control section 20 performs an operation for rightward scrolling of the map assigned to rightward flicking in the navigation mode. FIG. 3C illustrates rightward scrolling of the map in the navigation mode displayed on image display section 17 in FIG. 3B.

Figure 3D:
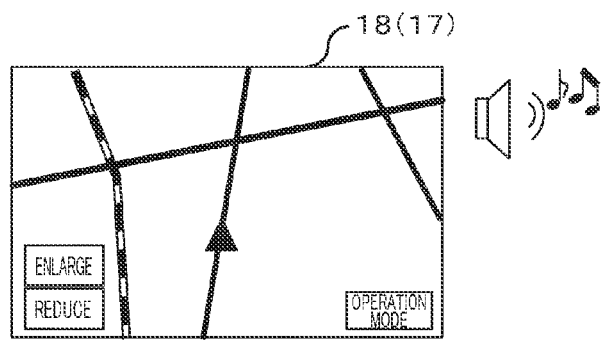
FIG. 3D illustrates an image of an example operation of the in-vehicle apparatus when the operator performs flicking input on the touch panel during running of the vehicle.

FIG. 3D illustrates an example operation in a case where gesture input for rightward flicking is performed on touch panel 18 of in-vehicle apparatus 10 executing the CD playback mode while the display mode is the navigation mode, when control section 20 determines that the vehicle is running on the basis of a signal from vehicle sensor 24.

A scrolling operation for the map while the vehicle is running may cause the operator to pay no attention to the forward direction of the vehicle and is therefore not preferred. Therefore, control section 20 disables the scrolling operation on the map screen while the vehicle is running.

The gesture for rightward flicking is an operation for the navigation mode as the display mode, but control section 20 disables scrolling of the map in response to gesture in consideration of safety of the operator. As a result, as illustrated in FIG. 3D, the displaying state of the map in FIG. 3B does not change in the navigation mode as the operation mode.

Here, let us consider a case where the volume of sound outputted from speaker 13 in the CD playback mode is controlled through an operation on touch panel 18 for in-vehicle apparatus 10 executing the two operation modes that are the navigation mode and the CD playback mode and executing the navigation mode as the display mode.

Since a volume control icon is not displayed on image display section 17, the operator need to perform a touch operation on touch panel 18 a plurality of times, for example, touching the position of display mode change icon 50 so as to display the volume control icon on image display section 17, changing the display mode, and operating a desired icon.

In this way, in order to control the volume, the display mode is switched, an icon having a desired function is displayed, and a touch operation is performed at the position of an icon having a desired function. Such complicated operations cause the operator to pay no attention to the forward direction of the vehicle.

In this respect, in-vehicle apparatus 10 in the present embodiment switches an operation mode for performing gesture input by the operator. This avoids complicated operations, such as performing a touch operation on icons a plurality of times, and enables a desired operation through one time of gesture input on whole touch panel 18 having a larger area than the icon, thus improving the safety.

Example operations of in-vehicle apparatus 10 will be explained in the case of switching an operation mode for performing gesture input by the operator, with reference to FIGS. 4A to 4D.

Figure 4A:
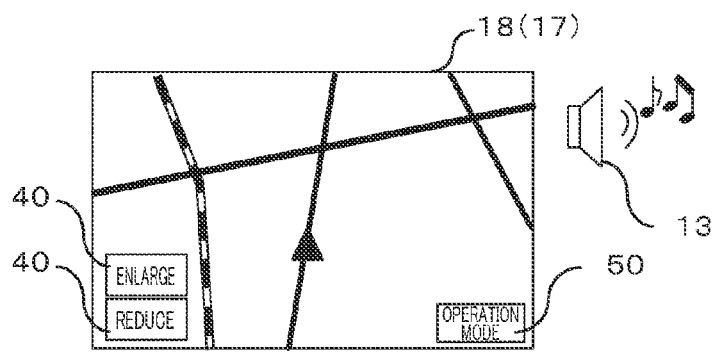
FIG. 4A illustrates an example display image of the image display section when the display mode is the navigation mode while a plurality of operation modes are executed.

As illustrated in FIG. 4A, image display section 17 displays a map for the navigation function, icons 40 for enlarging or reducing the map, and display mode change icon 50 for changing a function displayed on image display section 17.

Meanwhile, speaker 13 outputting music is schematically illustrated in order to illustrate that in-vehicle apparatus 10 also performs the CD playback mode at the same time.

Since the map and icon 40 for the navigation mode are displayed on image display section 17 at this time, display mode recognition section 32 recognizes that the display mode is the navigation mode.

Figure 4B:
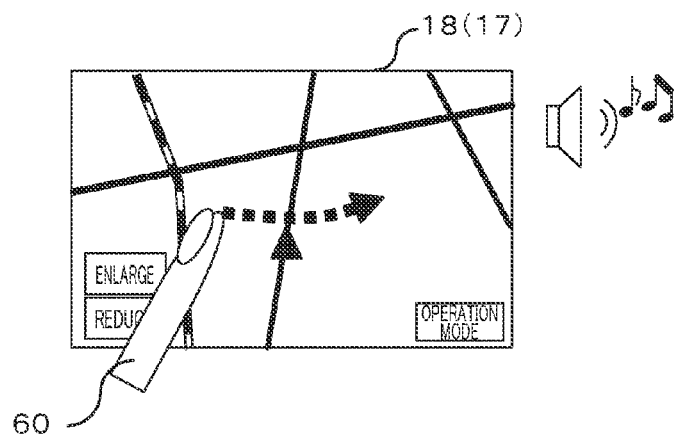
FIG. 4B illustrates an image of a state in which the operator performs flicking input on the touch panel when the display mode is the navigation mode.

FIG. 4B illustrates that the operator performs gesture input for rightward flicking on touch panel 18 with finger 60 when the CD playback mode is executed and when the display mode is the navigation mode.

Figure 4C:
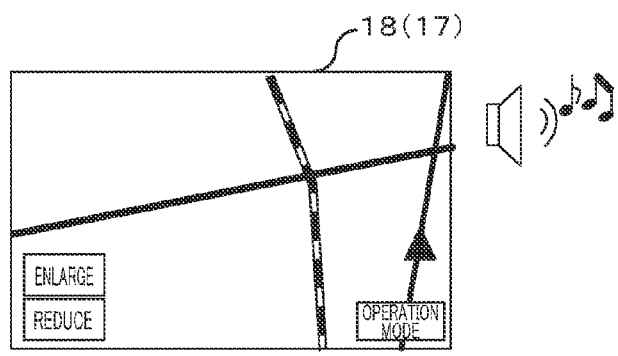
FIG. 4C illustrates an image of an example operation of the in-vehicle apparatus when the operator performs flicking input on the touch panel during stopping of the vehicle.

FIG. 4C illustrates an example operation in a case where gesture input for rightward flicking is performed on touch panel 18 of in-vehicle apparatus 10 executing the CD playback mode while the display mode is the navigation mode, when control section 20 determines that the vehicle is stopping on the basis of a signal from vehicle sensor 24.

Image display section 17 displays the map in the navigation mode, and display mode recognition section 32 recognizes that the display mode is the navigation mode.

Since the vehicle is stopping, operation mode determination section 34 determines that gesture for rightward flicking in FIG. 4B is an operation for the navigation mode as the display mode. Control section 20 then performs an operation for rightward scrolling of the map assigned to rightward flicking in the navigation mode. As illustrated in FIG. 4C, the map in the navigation mode displayed on image display section 17 in FIG. 4B is scrolled rightward.

Figure 4D:
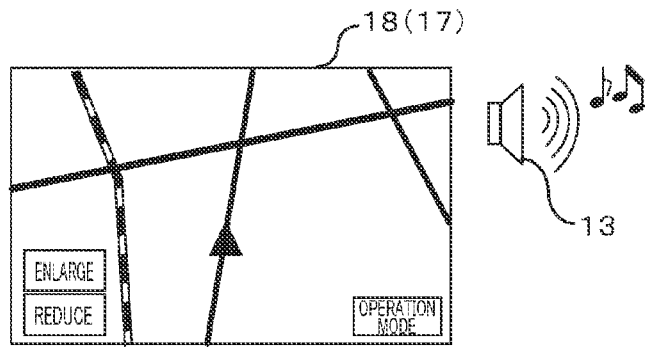
FIG. 4D illustrates an image of an example operation of the in-vehicle apparatus when the operator performs flicking input on the touch panel during running of the vehicle.

FIG. 4D illustrates an example operation in a case where gesture input for rightward flicking is performed on touch panel 18 of in-vehicle apparatus 10 executing the CD playback mode while the display mode is the navigation mode, when control section 20 determines that the vehicle is running on the basis of a signal from vehicle sensor 24.

Image display section 17 displays the map in the navigation mode, and display mode recognition section 32 recognizes that the display mode is the navigation mode.

Since the vehicle is running, operation mode determination section 34 determines that the gesture for rightward flicking is not an operation for the navigation mode as the display mode and determines the gesture to be an operation for the CD playback mode being executed although the CD playback mode is not displayed on image display section 17.

Control section 20 performs increasing of the volume, which is a function assigned to the gesture for rightward flicking in the CD playback mode. FIG. 4D schematically illustrates that the output volume from the speaker 13 increases.

That is, even during running of the vehicle, it is made possible to perform an operation for a function not displayed on the screen, by an easy operation, i.e., easy gesture for rightward flicking without impairing the safety, instead of a plurality of input operations for touching display mode change icon 50.

Next, the operations of in-vehicle apparatus 10 will be explained with reference to FIG. 5.

Figure 5:
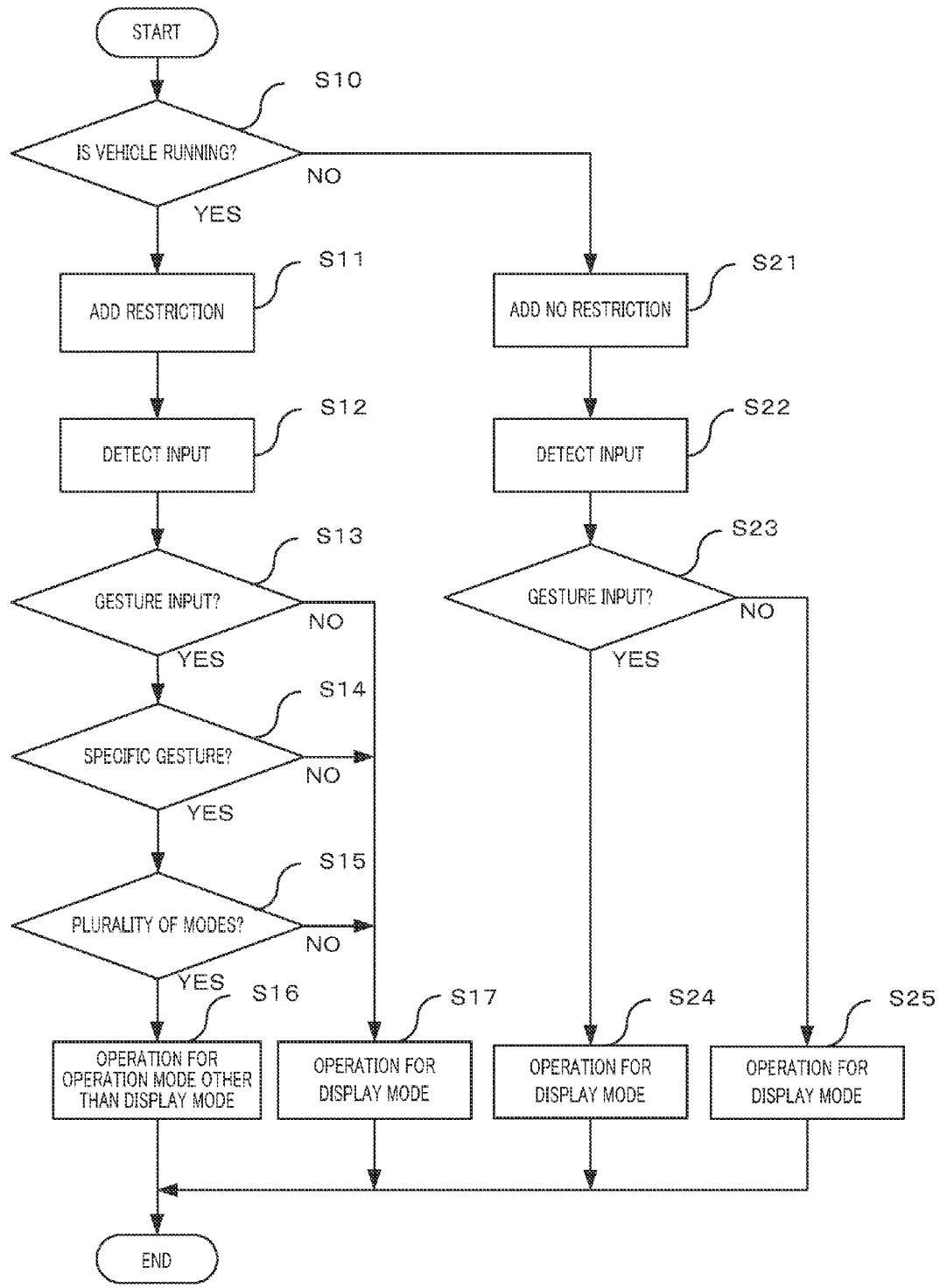
FIG. 5 is a flow chart illustrating operations of the in-vehicle apparatus including the touch panel in the embodiment of the present invention.

A state where nothing touches touch panel 18 is defined as the start of operations (the start state in FIG. 5).

Control section 20 determines whether the vehicle is running or stopping on the basis of a signal from vehicle sensor 24 (Step S10). That is, based on the signal of the parking brake from vehicle sensor 24, control section 20 determines that the vehicle is running (YES in Step S10), when the parking brake is turned off.

When determining that the vehicle is running, control section 20 restricts, for example, input operations of the operator, such as scrolling of the map and searching for a destination, or restricts displaying of the icons for input operations restricted during the running of the vehicle (Step S11).

Control section 20 detects information outputted from touch panel 18 when the operator touches touch panel 18 (Step S12). That is, control section 20 detects that the operator has performed an input operation on touch panel 18.

When control section 20 detects the input of the operator on the basis of information from touch panel 18, gesture recognition section 33 determines whether the touch input operation is made to a specific place, such as a place for displaying an icon, or a gesture input operation is performed, on the basis of a time transition of the signal of the touch position outputted from touch panel 18 to control section 20 (Step S13). That is, if a time transition of the signal of the touch position outputted from touch panel 18 to control section 20 is larger than a predetermined value, gesture recognition section 33 determine that gesture input operation is performed (YES in Step S13).

Gesture recognition section 33 recognizes the gesture performed by the operator on the basis of a time transition of the signal of the touch position outputted from touch panel 18 to control section 20, and determines whether the recognized gesture is a specific gesture assigned to performing of a function restricted in control section 20 (Step S14).

When gesture recognition section 33 determines that the recognized gesture is this specific gesture (YES in Step S14), control section 20 determines whether a plurality of operation modes are executed in in-vehicle apparatus 10 (Step S15). More specifically, control section 20 determines whether the operation mode performed in in-vehicle apparatus 10 is only the operation mode recognized by display mode recognition section 32, or any operation mode other than this recognized operation mode is also performed.

When control section 20 determines that a plurality of operation modes are executed in in-vehicle apparatus 10 (YES in Step S15), operation mode determination section 34 determines that the gesture recognized by gesture recognition section 33 is an operation to an operation mode other than the display mode, and performs a function assigned to gesture in the operation mode other than the display mode (Step S16).

Meanwhile, in any one of the three cases described below, operation mode determination section 34 determines that the gesture recognized by gesture recognition section 33 is an operation to the display mode (Step S17). The first is a case where gesture recognition section 33 determines that gesture input operation is not recognized (NO in Step S13). The second is a case where gesture recognition section 33 recognizes the gesture as a gesture input operation, and where the gesture is determined not to be a specific gesture assigned to performing of a function restricted in control section 20 (NO in Step S14). The third is a case where the gesture is recognized as specific gesture, and where control section 20 determines that the operation mode performed in in-vehicle apparatus 10 is only the operation mode recognized by display mode recognition section 32 (NO in Step S15). Additionally, since the gesture is assigned to performing of a function restricted in control section 20 when the operation to the display mode is a gesture recognized by gesture recognition section 33, the gesture operation is made invalid. On the other hand, when the operation to the display mode is a touch input operation to a specific place, such as a place for displaying an icon (NO in Step S13), control section 20 performs a function assigned to the place touched by the operator or a function assigned to the icon displayed on the touched place (Step S17).

Moreover, when the parking brake is turned on, control section 20 determines that the vehicle is stopping (NO in Step S10) on the basis of the signal of the parking brake from vehicle sensor 24.

When determining that the vehicle is stopping, control section 20 does not restrict, for example, input operations of the operator, such as scrolling of the map and searching for a destination, or does not restrict displaying of the icons for input operations restricted during the running of the vehicle (Step S21).

Control section 20 detects information outputted from touch panel 18 in response to the operator touching touch panel 18 (Step S22). That is, control section 20 detects that the operator performs an input operation on touch panel 18.

When control section 20 detects the input of the operator on the basis of information from touch panel 18, gesture recognition section 33 determines whether the touch input operation is made to a specific place, such as a place for displaying an icon, or a gesture input operation is performed, on the basis of a time transition of the signal of the touch position outputted from touch panel 18 to control section 20 (Step S23).

If gesture recognition section 33 determines that a time transition of the signal of the touch position outputted from touch panel 18 to control section 20 is larger than a predetermined value and that the input of the operator is a gesture input operation (YES in Step S23), the following operation is performed. That is, operation mode determination section 34 determines that the gesture recognized by gesture recognition section 33 is an operation to the display mode, and performs a function assigned to gesture in the display mode (Step S24).

When gesture recognition section 33 determines that a time transition of the signal of the touch position outputted from touch panel 18 to control section 20 is smaller than a predetermined value and that the input of the operator is a touch input operation to a specific place, such as a place for displaying an icon (NO in Step S23), the following operation is performed. That is, control section 20 performs a function assigned to the place touched by the operator or a function assigned to the icon displayed on the touched place (Step S25).

As described above, according to the present embodiment, it is possible to perform an operation to a not display operation mode with a single operation of gesture assigned to performing of a function restricted during the running of the vehicle. As a result, it is no longer necessary, for example, to switch the display mode or perform an input operation a plurality of times in order to display the icon assigned to a desired function. This can provide both a reduction in factors causing the operator to pay no attention to the forward direction of the vehicle and the securement of operability. Meanwhile, an icon that allows a desired operation to be performed by a single operation does not have to be always displayed on image display section 17 because a gesture input is used. This can ensure the visibility of image display section 17.

Meanwhile, as to determination of whether the vehicle is running or stopping, the vehicle may be determined to be stopping when the vehicle speed calculated from a vehicle speed signal of vehicle sensor 24 is equal to or less than a predetermined value. In this case, situations such as running or stopping of the vehicle or the like can be determined more surely in comparison with determination based on only the state of the parking brake.

In the present embodiment, rightward flicking is used as an example gesture input of the operator, but leftward flicking or flicking in the vertical direction may be used as well. In this case, operations to a not displayed operation mode are made possible, the operations including rightward flicking for increasing the volume, leftward flicking for decreasing the volume, upward flicking for restarting playback of a song currently played on a CD, downward flicking for starting playback of a song subsequent to the song currently played on the CD, for example. As a result, the usability is improved.

Furthermore, a gesture assigned to performing of a function restricted during running of the vehicle may be flicking with a plurality of fingers or other gestures. In this case, the operator does not need to learn a new gesture for an operation to an operation mode other than the display mode.

The disclosure of Japanese Patent Application No. 2012-061461, filed on Mar. 19, 2012, including the specification, drawings and abstract, is incorporated herein by reference in its entirety.

INDUSTRIAL APPLICABILITY

The in-vehicle apparatus according to the present invention can change an operation mode targeted for performing gesture input from the touch panel by the operator, in accordance with the running state of the vehicle, thereby allows a function other than a displayed operation mode to be performed easily with a gesture for performing a function restricted during the running of the vehicle, and is thus useful as an in-vehicle apparatus such as a navigation apparatus ensuring safety with good operability.

REFERENCE SIGNS LIST

10 In-vehicle apparatus
11 Storing section
12 External input section
13 Speaker
17 Image display section
18 Touch panel
20 Control section
22 DVD/CD drive
23 GPS receiver
24 Vehicle sensor
25 Gyroscope
31 Display mode switching section
32 Display mode recognition section
33 Gesture recognition section
34 Operation mode determination section
40 Icons
50 Display mode change icon
60 Finger

The invention claimed is:
1. An in-vehicle apparatus comprising:
an image display section that displays an image;
a touch panel that is provided over the image display section and that detects information on a position touched by an operator; and a control section that recognizes a gesture inputted on the touch panel, wherein when the vehicle is running, the control section determines that the recognized gesture is performed as an operation to a first operation mode other than a second operation mode displayed on the image display section and performs a function assigned to the gesture in the first operation mode, and when the vehicle is stopping or the vehicle speed is equal to or less than a predetermined value, the control section determines that the recognized gesture is performed as an operation to the second operation mode displayed on the image display section and performs a function assigned to the gesture in the second operation mode.

2. The in-vehicle apparatus according to claim 1, the control section further comprising:

a display mode recognition section that recognizes the operation mode displayed on the image display section;

a gesture recognition section that recognizes the gesture inputted on the touch panel; and an operation mode determination section that determines to what operation mode the gesture recognized by the gesture recognition section is performed as the operation.

3. The in-vehicle apparatus according to claim 1, wherein the control section determines the recognized gesture is performed as the operation to the second operation mode displayed on the image display section, when the operation mode performed in in-vehicle apparatus is only the second operation mode displayed on the image display section.

4. The in-vehicle apparatus according to claim 1, wherein the control section determines the recognized gesture is performed as the operation to the second operation mode displayed on the image display section, when a time transition of the signal of the touch position outputted from touch panel to control section is larger than a predetermined value and the input of the operator is a gesture input operation.

5. The in-vehicle apparatus according to claim 1, wherein the control section performs a function assigned to the place touched by the operator or a function assigned to the icon displayed on the touched place, when a time transition of the signal of the touch position outputted from touch panel to the control section is smaller than a predetermined value and the input of the operator is a touch input operation to a specific place.

* * * * *